United States Patent

Carlson et al.

(10) Patent No.: US 8,837,948 B2
(45) Date of Patent: Sep. 16, 2014

(54) MULTIMODE OPTICAL AMPLIFIER AS A RECEIVER PRE-AMPLIFIER FOR FREE-SPACE OPTICAL COMMUNICATIONS

(75) Inventors: Robert T. Carlson, Bedford, NH (US); Daniel J. Creeden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 364 days.

(21) Appl. No.: 12/822,404

(22) Filed: Jun. 24, 2010

(65) Prior Publication Data

US 2010/0329681 A1  Dec. 30, 2010

Related U.S. Application Data

(60) Provisional application No. 61/219,821, filed on Jun. 24, 2009.

(51) Int. Cl.
| | | |
|---|---|---|
| *H04J 14/02* | (2006.01) | |
| *H04B 10/12* | (2006.01) | |
| *H01S 3/00* | (2006.01) | |
| *H04B 10/112* | (2013.01) | |
| *H01S 3/131* | (2006.01) | |
| *H01S 3/094* | (2006.01) | |
| *H01S 3/10* | (2006.01) | |

(52) U.S. Cl.
CPC ............. *H04B 10/112* (2013.01); *H01S 3/1312* (2013.01); *H01S 3/094003* (2013.01); *H01S 3/10015* (2013.01)
USPC ................ 398/79; 398/43; 398/118; 398/85; 359/337.2; 359/341.5; 359/341.33; 359/341.2

(58) Field of Classification Search
USPC ..................................... 398/79, 43; 359/337.2
See application file for complete search history.

(56) References Cited

U.S. PATENT DOCUMENTS

| | | | |
|---|---|---|---|
| 7,953,130 B2* | 5/2011 | Ouchi et al. ..................... 372/25 |
| 2003/0137722 A1* | 7/2003 | Nikolajsen et al. ......... 359/341.1 |
| 2005/0122574 A1* | 6/2005 | Kakui et al. ................ 359/341.1 |
| 2006/0158718 A1* | 7/2006 | Pan et al. .................... 359/341.1 |
| 2007/0025230 A1* | 2/2007 | Chang ............................ 369/116 |

* cited by examiner

*Primary Examiner* — Oommen Jacob
(74) *Attorney, Agent, or Firm* — Daniel J. Long

(57) ABSTRACT

In the method for processing a signal light from free-space by amplifying said signal for free-space optical communications, wherein the improvement includes the steps of (a) pre-amplifying said signal light with low noise; and (b) coupling said signal light into a multimode filter which reduces coupling losses compared to single mode filters.

1 Claim, 1 Drawing Sheet

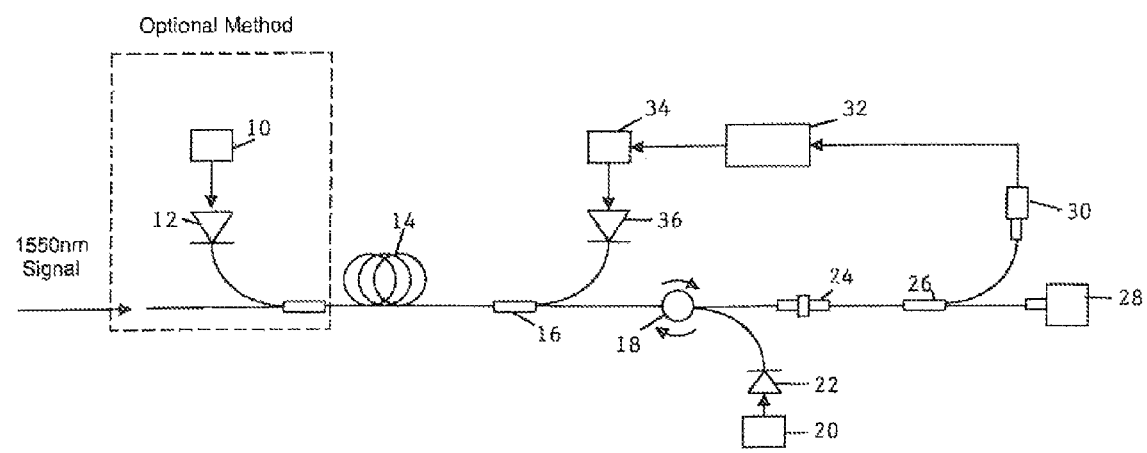

MULTIMODE OPTICAL AMPLIFIER AS A RECEIVER PRE-AMPLIFIER FOR FREE-SPACE OPTICAL COMMUNICATIONS

CROSS REFERENCE TO RELATED APPLICATION

This application claims rights under 35 USC 119(e) from U.S. application Ser. No. 61/219,821 filed Jun. 24, 2009.

BACKGROUND OF THE INVENTION

1. Field of the Invention

The present invention relates to laser communications and more particularly to ways for amplifying signals in laser communications.

2. Brief Description of Prior Developments

The receiver sensitivity for an atmospheric laser communications system is increased by focusing the free-space light into a multimode fiber amplifier that pre-amplifies the received signal. For laser communications in the 1500-1600 nm region, we have used a multimode erbium-doped fiber amplifier (EDFA). Other fiber amplifiers are applicable for other wavelengths. Typical systems use readily available single mode EDFAs as receiver preamps, but this arrangement typically results in a 5-10 dB coupling loss of signal into a single mode EDFA from free-space, even with the benefit of adaptive optics correction. Multimode fibers have a larger core diameter and a larger numerical aperture (NA), thus permitting the collection of aberrated free-space optical wave fronts with minimal losses. Amplifying this signal with a multimode EDFA provides increased detector sensitivity compared to a (multimode) detector with no preamp, and also better net receiver sensitivity than a single mode preamp, which has an inherently high coupling loss.

An improved method and apparatus for amplifying signals in laser communications.

SUMMARY OF INVENTION

According to the present invention, the signal light from free-space is coupled into a multimode fiber which reduces coupling losses compared to single mode fibers, as the core diameter and NA of multimode fibers are larger than single mode, thus allowing for a much wider acceptance angle, and also resulting in the capture of high-order modes of a distorted atmospheric wave front. To increase the sensitivity of the receiver subsystem, the signal in the multimode fiber needs to first be pre-amplified with low noise. This is accomplished for 1500-1600 nm signals in a multimode EDFA. Since there is minimal insertion loss into multimode fiber from free-space, the signal is collected and amplified efficiently, allowing for the receiver subsystem (i.e., multimode EDFA preamp and detector) to have enhanced sensitivity compared to the detector alone.

BRIEF DESCRIPTION OF THE DRAWINGS

The present invention is further described with reference to the accompanying drawings wherein:

FIG. 1 is a schematic drawing showing a preferred embodiment of the method and apparatus of the present invention.

DETAILED DESCRIPTION OF THE PREFERRED EMBODIMENT

Referring to FIG. 1, in the method of the present invention a co-pumped diode driver 10 and a 980 µm co-pumped diode 12 may optionally be used to drive a 1550 µm signal through a multimode er-doped fiber 14. The signal then enters a multimode (MM) 980/1550 pump wave division multiplexer (WDM) 16 and then to an MM circulator 18 which is driven by diode driver 20 and a 1532 µm diode 22. The signal then goes to band pass filter 24 and through tap coupler 26 to detector 28. From tap coupler 26 the signal is also directed to AGC detector 30 to automatic gain control (AGC) circuit 32 and then to counter-pumped diode driver 34 and then to 980 µm counter-pump diode 36 and then back to the MM 980/1550 pump WDM 16.

Those skilled in the art will, appreciate that the present invention overcomes insertion loss, fading, and receiver sensitivity disadvantages listed above; tolerant of residual angle-of-arrival of optical wave front due to atmospheric propagation, aero-optic boundary layer effects, or high bandwidth uncompensated residual tracking jitter; net result is lower bit and packet error rate for a free-space laser communications link (FSO). Unique approach employs counter-pumping from the exit end of the EDFA, to provide highest inversion in the downstream portion of the EDF where the amplified signal intensity is the greatest. This optical components on a bench that must be held. The present invention also is a single-stage amplifier, which results in fewer components and a more cost-effective solution for production. This is achieved in part by using an avalanche photodiode (APD) for the detector, rather than a PIN photodiode. The APD provides a 6-10 dB sensitivity advantage over a PIN detector, which allows the EDFA to be implemented with a single stage amplifier.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An apparatus for processing a signal light from free-space to amplify said signal light for free-space optical communication comprising:

a wave division multiplexer connected to a multimode er-doped fiber carrying the signal light;

a multimode circulator connected to the wave division multiplexer wherein the multimode circulator is driven by a diode driver and a diode;

a band pass filter coupled with the wave division multiplexer wherein the band pass filter is connected to the multimode circulator which in turn is connected to the wave division multiplexer;

a tap coupler wherein the tap coupler connects the band pass filter to a receiver subsystem detector and also directs the signal light to an automatic gain control detector;

an automatic gain control circuit connected to the automatic gain control detector;

a counter-pumped diode driver connected to the automatic gain control circuit; and a counter-pumped diode connected to the counter-pumped diode driver, wherein the counter-pumped diode counter pumps the amplified signal light to the wave division multiplexer.

* * * * *